(12) United States Patent
Kamei

(10) Patent No.: US 6,760,063 B1
(45) Date of Patent: *Jul. 6, 2004

(54) CAMERA CONTROL APPARATUS AND METHOD

(75) Inventor: Yoichi Kamei, Chofu (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,046

(22) Filed: Apr. 2, 1997

(30) Foreign Application Priority Data

Apr. 8, 1996 (JP) .............................................. 8-085072

(51) Int. Cl.[7] .............................................. H04N 5/232
(52) U.S. Cl. .............................. 348/211.8; 348/333.01; 348/159; 348/143
(58) Field of Search ........................... 348/36, 218, 47, 348/48, 159, 157, 154, 211, 15, 153, 143, 335, 239, 151, 152, 37, 39, 211.99, 211.4, 211.8, 211.9, 211.11, 333.01, 333.12, 333.05

(56) References Cited

U.S. PATENT DOCUMENTS

| | | | | |
|---|---|---|---|---|
| 4,081,830 A | * | 3/1978 | Mick et al. .................... | 348/55 |
| 4,581,647 A | * | 4/1986 | Vye ............................. | 348/212 |
| 4,992,866 A | * | 2/1991 | Morgan ....................... | 348/159 |
| 5,049,988 A | * | 9/1991 | Sefton et al. ................ | 348/143 |
| 5,182,641 A | * | 1/1993 | Diner et al. ................. | 348/159 |
| 5,187,571 A | * | 2/1993 | Braun et al. .................. | 348/39 |
| 5,241,380 A | * | 8/1993 | Benson et al. .............. | 348/143 |
| 5,598,208 A | * | 1/1997 | McClintock ................. | 348/159 |
| 5,657,073 A | * | 8/1997 | Henley ........................ | 348/211 |
| 5,677,708 A | * | 10/1997 | Matthews, III et al. ...... | 345/115 |
| 5,872,594 A | * | 2/1999 | Thompson ................... | 348/213 |
| 5,929,904 A | * | 7/1999 | Uchida ........................ | 348/211 |
| 5,963,250 A | * | 10/1999 | Parker et al. ............... | 348/211 |
| 6,137,485 A | * | 10/2000 | Kawai et al. ................ | 348/211 |

* cited by examiner

*Primary Examiner*—Tuan Ho
(74) *Attorney, Agent, or Firm*—Morgan & Finnegan, LLP

(57) ABSTRACT

For easy operation of switching a plurality of cameras, the cameras are arranged in juxtaposition such that the image-sensible range between the cameras partially overlap each other. A frame 36 indicative of a combined image-sensible range which includes an image-sensible range of each of the plurality of cameras is displayed on a monitor screen, and a frame 38 indicative of an image-sensing range of a selected camera is displayed in the frame 36 with a position and size corresponding to the direction and magnification of the image sensing. A sensed image of a corresponding camera is continuously displayed in the frame 38. By moving the frame 38, the image-sensing direction of the corresponding camera is controlled, and by enlarging/reducing the frame 38, the magnification of the corresponding camera is controlled. When the frame 38 is moved to an image-sensible range of another camera, a camera subject to the control operation or image displaying is switched to another camera which corresponds to the new image-sensible range.

50 Claims, 12 Drawing Sheets

CAMERA CONTROL APPARATUS AND METHOD

BACKGROUND OF THE INVENTION

Present invention relates to a camera control apparatus, and more particularly, to a camera control apparatus for controlling an image sensing direction (panning/tilting) and a zooming ratio of a plurality of cameras.

Conventionally, to remotely operate a video camera whose image sensing directions (panning and tilting) and image sensing magnification ratio (zooming) are externally controllable, means such as operation lever which is rotatable along two axles, or push buttons, or buttons displayed on an image display screen modeling after such lever or push buttons or the like are available. By utilizing such means, for instance, a camera rotation angle or angle velocity is changed in accordance with the operation of the lever, or camera rotation is realized or a zooming ratio is changed while the button is depressed. As a matter of course, absolute or relative angles of panning/tilting and a zooming ratio may be designated by directly inputting a value.

In a case where a plurality of cameras are to be controlled by such camera control apparatus, camera operation means may be provided for each of the plurality of cameras, or combination of camera selection means for selecting a control-subject camera and camera operation means for operating the selected camera may be provided. When a large number of cameras are to be controlled, the latter arrangement is more advantageous with respect to cost.

In remote control operation, a camera is operated by viewing an image sensed by the camera in a monitor screen. In the conventional apparatus, no other information besides the image sensed by the subject camera (the camera subjected to remote operation, or the camera whose sensed image is to be viewed) is displayed on the monitor screen. Therefore, for instance, if an operator wishes to direct a camera to an image outside a present image-sensing range of the subject camera, the operator must perform operation through trial and error to find the image of interest.

Although the image-sensible range of a camera is limited, in most cases, an operator is not informed of the image-sensible range of operating cameras. Even if the operator is informed of the image-sensible range of the cameras, such information is indicated by values only e.g., angles of the camera or the like, thus the operator cannot easily confirm the image-sensible range on a monitor screen which performs remote control operation. In addition, the operator cannot easily confirm the present direction of the camera within the image-sensible range.

Furthermore, in the case where a plurality of cameras are to be remotely operated, an appropriate camera must be first selected in accordance with an operator's target position. Therefore, it is necessary to display information with respect to an image-sensing range of each camera in a user-friendly manner. Particularly in a case where a moving subject is to be sensed by a plurality of video cameras arranged in juxtaposition so that an image-sensing view is continuous, an operator must switch cameras to obtain a camera to be remote-controlled or whose image is to be displayed each time the subject image moves, and perform necessary control operation. Since such operation is quite complicated, there has been a demand for easier operation method.

SUMMARY OF THE INVENTION

The present invention has been made in consideration of the above situation, and has as its object to provide a camera control apparatus which solves the above problem.

Another object of the present invention is to provide a camera control apparatus which enables easy camera switching and easy camera operation of a plurality of video cameras arranged in juxtaposition.

According to the present invention, a combined image-sensible range of a plurality of cameras is displayed in a monitor screen, and an area of an image-sensing range of a currently-selected camera which is located within the combined image-sensible range is displayed in the position and the size corresponding to the image-sensing direction and image-sensing magnification of the currently-selected camera. In the image-sensing range of the selected camera, an image sensed by the selected camera is displayed continuously. Accordingly, an operator is able to confirm the image-sensing range of the selected camera within the entire image-sensible range of the plurality of cameras. Also, an operator is able to perform control operation of a plurality of cameras as if he/she is operating only one camera.

Also, in a case where image sensing is performed by switching a plurality of cameras, following a subject moving from one camera's image-sensible range to another camera's image-sensible range, an operator is able to switch cameras by operating the image-sensing range displayed by image-sensing-range display means. Accordingly, camera-switch operation becomes easy.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
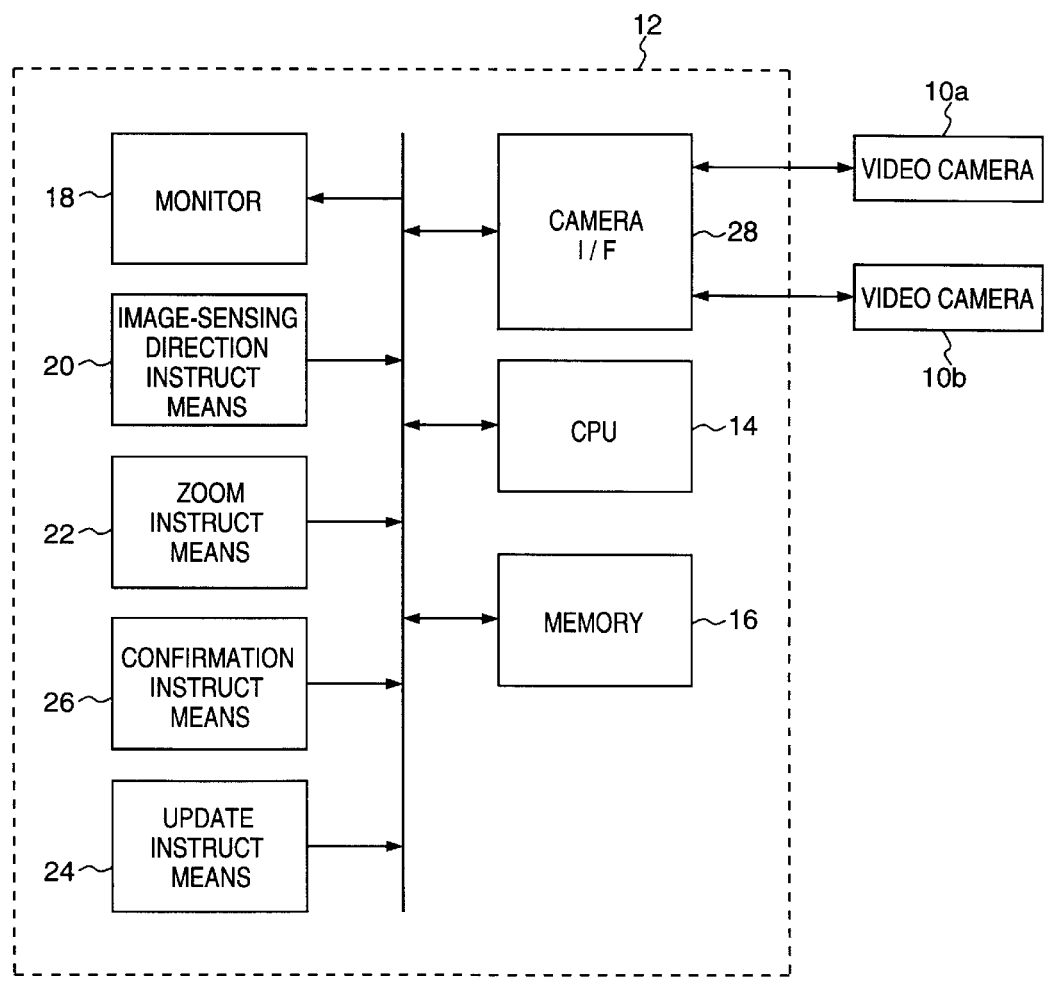
FIG. 1 is a block diagram showing a general structure of the first embodiment.

FIG. 1 is a block diagram showing a general structure of the first embodiment. Referring to FIG. 1, reference numeral 10a and 10b denote video cameras which are arranged in juxtaposition facing the same direction and whose image-sensing direction (pan and tilt) and an image-sensing magnification ratio (zoom) are externally controllable; and 12, a camera control apparatus which controls the video cameras 10a and 10b to display images sensed by these cameras. The camera control apparatus 12 is constructed with a personal computer or a work station. In the present embodiment, for the purpose of explanatory convenience, the two video cameras 10a and 10b are utilized. However, the present invention is also applicable to the case where more than three video cameras are utilized.

The camera control apparatus 12 includes: a CPU 14 which controls the entire apparatus; a memory 16 which stores control programs or control data for the CPU 14, control values or the like for the video cameras 10a and 10b, and image data derived from the video cameras 10a and 10b; an image monitor 18 which displays an image; image-sensing-direction instruct means 20 which instructs the CPU 14 of an image-sensing direction of the cameras 10a and 10b; zoom instruct means 22 which instructs the CPU 14 of an image-sensing magnification ratio of the cameras 10a and 10b; update instruct means 24 which instructs updating of derived images in a combined image-sensible range in which all the image-sensible range (field of view) of the cameras 10a and 10b is combined; and confirmation instruct means 26 which instructs the CPU 14 to confirm input of various instructions (e.g., instruction by the instruct means 20, 22 and 24).

Reference numeral 28 denotes a camera interface for connecting video cameras 10a and 10b, where various camera control signals e.g., panning, tilting or zooming values, are supplied to the cameras 10a and 10b, or various video signals from the cameras 10a and 10b are received.

The devices 14 to 28 included in the camera control apparatus 12 are connected to a system bus 29, and various data is transferred through the system bus 29.

Figure 2:
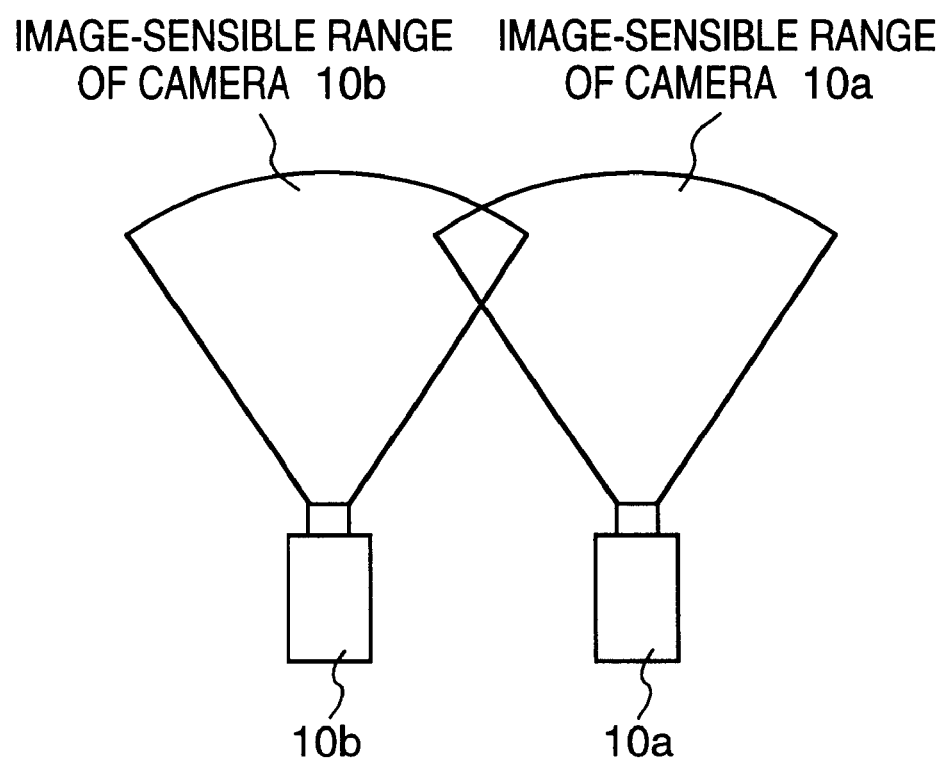
FIG. 2 is a diagram showing an arrangement of cameras 10a and 10b used in the present embodiment.

FIG. 2 is a plan view showing an arrangement of the cameras 10a and 10b. The cameras 10a and 10b are directed to the same direction in an initial state, and are arranged in juxtaposition such that the image-sensible range, which is an area sensible by panning, tilting or zooming a camera, partially overlap each other. The partially-overlapped image-sensible range of the cameras 10a and 10b enables to assure a wide camera view which cannot be attained by a single camera, without a dead angle. More than two cameras may be arranged in juxtaposition, or may be positioned side by side or on top of each other.

Figure 3:
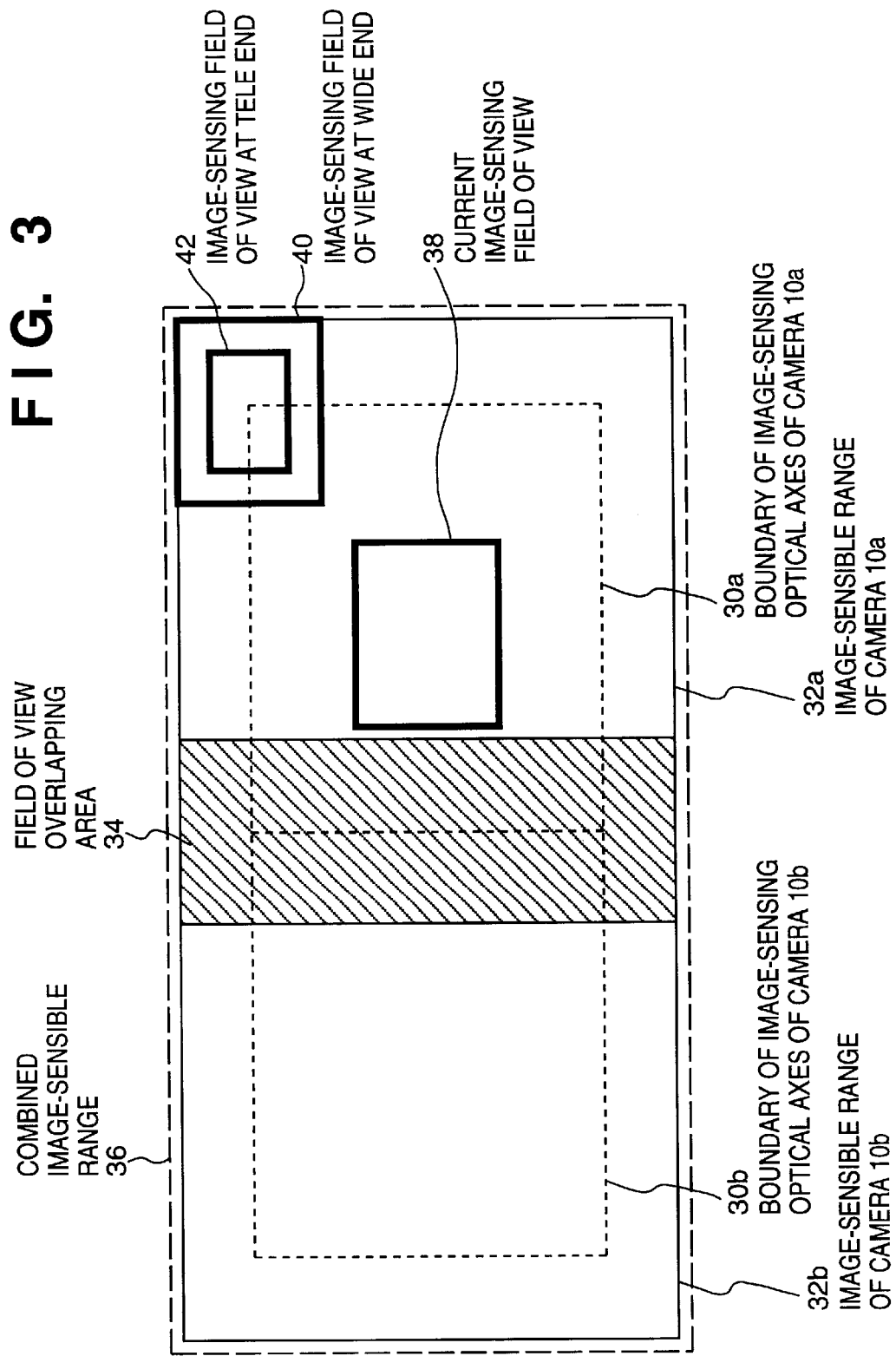
FIG. 3 shows a display screen of a monitor 18 according to the present embodiment.

FIG. 3 shows a display screen of the image monitor 18 according to the present embodiment. The image monitor 18 may be an independent image display apparatus, or may be a single window in a window display system. Referring to FIG. 3, rectangular frames 30a and 30b indicated by the broken lines show the positions of image-sensing optical axes at a boundary of pan/tilt of the cameras 10a and 10b, that is, the movable ranges of image-sensing optical axes of the cameras 10a and 10b. A rectangular frames 32a and 32b surrounding the rectangular frames 30a and 30b respectively indicate the image-sensible range (or a field of view) of the camera 10a and 10b. The rectangular frames 32a and 32b are the widest image-sensing range obtained when zooming is set at the widest end (least magnification) at the boundary point of pan/tilt.

The rectangular frames 32a and 32b overlap each other in a portion 34 indicated by hatching. That is, the hatched portion 34 is a field of view overlapping area. A rectangular frame 36 including the image-sensible ranges 32a and 32b of the cameras 10a and 10b indicates the combined image-sensible range (field of view) which can be obtained by combining the image-sensible ranges 32a and 32b. (Note that in FIG. 3, the rectangular frame 36 is indicated by broken lines in the outer portion of the rectangular frames 32a and 32b for illustrative convenience.) In other words, the field of view overlapping area 34 is equivalent to a logical multiplication of the rectangular frames 32a and 32b, and the combined image-sensible range 36 is equivalent to a logical addition of the rectangular frames 32a and 32b.

In order to display an image, sensed by a plurality of cameras arranged in juxtaposition, without any awkward gap in movement of the displayed image, it is preferable to arrange the cameras 10a and 10b such that the width of the field of view overlapping area 34 is larger than the width of the image-sensing range at the maximum wide angle (wide end) of the video cameras 10a and 10b.

A rectangular frame 38 indicated by the thick solid line denotes an image-sensing range of a currently-selected video camera (camera 10a in FIG. 3), with the present panning angle, tilting angle and zooming magnification ratio. In FIG. 3, the video camera 10a faces the center of the image-sensible range of the camera 10a and the zooming magnification ratio is set at the maximum wide angle (wide end).

The rectangular frame 40 indicates an image sensing range obtained in a case where the video camera 10a is panned and tilted to the boundary of the upper right while the zooming is set at the maximum wide angle (wide end). The rectangular frame 42 indicates an image sensing range obtained at the maximum telescopic angle (tele end). In other words, when the video camera 10a is panned and tilted to the boundary of the upper right and zooming is set at the maximum wide angle (wide end), the rectangular frame 38 indicative of current image-sensing range is displayed at the position of the rectangular frame 40. With the same optical axes of the video camera 10aif zooming is set at the maximum telescopic angle (tele end), the rectangular frame 38 is displayed at the position of the rectangular frame 42.

Figure 4:
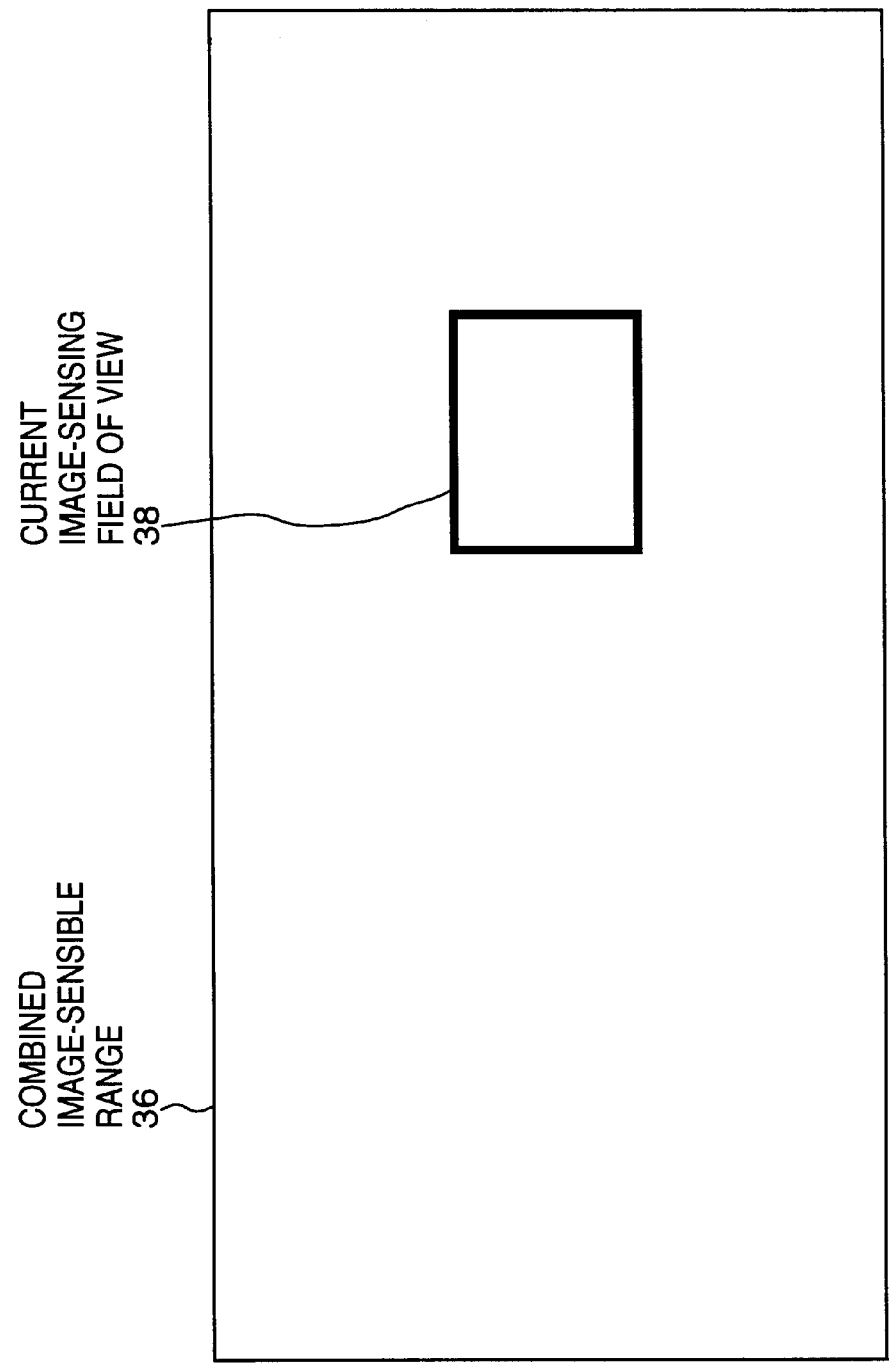
FIG. 4 shows another display screen of the monitor 18 according to the present embodiment.

Note that in the present embodiment, a current-selected camera, either the cameras 10a or 10b, only needs to be managed within the control apparatus, thus needs not be specifically informed to the operator. In view of this, the rectangular frames 30a, 30b, 32a, 32b, and the field of view overlapping area 34 need not be displayed on the screen of the image monitor 18. In other words, frames to be displayed on the screen of the image monitor 18 are the rectangular frame 36 indicative of the combined image-sensible range and the rectangular frame 38 indicative of the current image-sensing range as shown in FIG. 4.

According to the present embodiment, an operator views an image displayed in the rectangular frame 36 as if the image is the sensible range of a single camera. The camera switching operation necessary to change an image-sensing direction is performed by the processing of the present control apparatus. The processing will be apparent from the following description.

Operation of the present embodiment will now be described in detail with reference to FIGS. 5 and 6.

Images sensed in an entire image-sensible range of the cameras 10a and 10b are displayed in the rectangular frame 36 indicative of the combined image-sensible range (step S1). More specifically, zooming is set at wide end and each of the video cameras 10a and 10b are panned and tilted from one side to the other side of the boundary of pan/tilt. A subject within the image-sensible ranges 32a and 32b is sequentially sensed and stored in the memory 16. Then the sensed images are combined to be displayed within the rectangular frame 36.

It is then controlled such that pan, tilt, and zoom values of the video cameras 10a and 10b are set at an initial setting condition (step S2). The initial setting condition is e.g., if a video camera 10a is selected, the condition where the camera 10a faces the center of the image-sensible range 32a and zooming is set at wide end. The condition may be arbitrarily set by an operator such that the camera faces the center of the combined image-sensible range 36.

Upon setting the initial setting (step S2), an image sensed by the selected camera 10a (or camera 10b) is derived and stored in the memory 16. In the combined image-sensible range 36, the rectangular frame 38 is overwritten with the size corresponding to the present zooming ratio at a position corresponding to the present panning/tilting position of the selected camera 10a (or camera 10b). Then, the sensed image is overwritten such that it fits in the rectangular frame 38 (step S3).

Thereafter, in a case where no update request for updating an image of the maximum field of view is received (step S4) and no control request of the video camera 10 is received (step S9), image sensing and displaying of the sensed image are repeated (step S3). Accordingly, the sensed image of the video camera 10a (or camera 10b) is displayed as a moving picture in the rectangular frame 38.

An update request in step S4 for updating an image of the maximum field of view is determined by whether or not the update instruct means 24 receives an update input operation. The update request is input by, e.g., performing input operation which has been set as an update request, by an input apparatus such as a pointing device e.g. a key board or mouse or the like.

In the case of receiving the update request (step S4), the current conditions (panning angle, tilting angle, zooming value and the like) of the selected video camera 10a (or camera 10b) are stored (saved) in the memory 16 (step S5). As similar to step S1, zooming is set at wide end and each of the video cameras 10a and 10b are panned and tilted from one side to the other side of the boundary of pan/tilt. A subject within the image-sensible ranges 32a and 32b is sequentially sensed and stored in the memory 16. Then the sensed images are combined to be displayed again in the rectangular frame 36 (step S6).

The condition of camera 10a (or camera 10b) is returned to the "selected" condition, and the setting (panning angle, tilting angle, zooming value) is returned to the conditions stored in step S5 (step S7). Thereafter image sensing is performed, and the sensed image is stored in the memory 16. The rectangular frame 38 is then overwritten with a size corresponding to the present zooming ratio at a position corresponding to the present panning/tilting position of the camera 10a (or camera 10b). Thereafter, the sensed image is overwritten such that it fits in the rectangular frame 38 (step S8). If no control request of the video cameras 10a and 10b is received (step S9), the processing returns to step S3 and image sensing and displaying of the sensed image is repeated.

The camera control request in step S9 is determined by whether or not the image-sensing direction instruct means 20 or the zoom instruct means 22 perform any input operation. The control request is also input by specific input operation which has been set as an instruction request, by an input apparatus such as a pointing device e.g. a key board or mouse or the like. For instance, the rectangular frame 38 is moved by dragging the frame with a mouse (operation performed by moving the subject while depressing a mouse button). In addition, the rectangular frame 38 is enlarged/reduced by operating a specific control spot on the rectangular frame 38 with a mouse, as exemplified in a drawing software or the like, whereby controlling a zoom value of the corresponding camera. By moving the rectangular frame 38 indicative of the current image-sensing range within the rectangular frame 36, an instruction can be made to select the camera 10a or 10b as a control subject. When the rectangular frame 38 is within the rectangular frame 32a, the camera 10a is selected. When the rectangular frame 38 is within the rectangular frame 32b, the camera 10b is selected.

In response to a panning/tilting request, the amount of movement of the rectangular frame 38 relative to the rectangular frame 32a (or 32b) is detected, and the amount of pan/tilt for the camera 10a (or camera 10b) is calculated (step S10). Detailed processing thereof is shown in FIG. 6.

First, a position of the rectangular frame 38 which has been moved is detected (step S21). It then calculates where the detected position is located, that is, which rectangular frame 32a or 32b indicative of the image-sensible range of respective cameras 10a and 10b (step S22). If the position is included in the rectangular frame 32a, the camera 10a is selected as the control-subject (step S23), otherwise the camera 10b is selected as the control-subject (step S24). If the rectangular frame 38 is included in the field of view overlapping area 34, a camera determined in accordance with a predetermined priority, or a camera selected before the rectangular frame 38 is moved, becomes the control-subject. The amount of pan/tilt for the camera 10a (or 10b) is calculated on the basis of the relative position of the rectangular frame 38 with respect to the rectangular frame 32a (or 32b) indicative of the image-sensible range of the control-subject camera 10a (or 10b) (step S25).

In response to a zooming request, the necessary zooming ratio is calculated on the basis of the new size of the rectangular frame 38. For instance, the size of the rectangular frame 38 at wide end is compared with the size of the rectangular frame 38 at tele end, to calculate the zooming ratio corresponding to the new size (step S11).

In the present embodiment, the checking of whether or not there is any input instruction by the image-sensing-direction instruct means 20 and the zoom instruct means 22 is executed sequentially; however, it may be executed asynchronous by an interruptive process or the like.

Next, the selected video camera 10a (or 10b) is controlled such that the camera is set in the conditions obtained in steps S10 and S11 (step S12). Then with that setting, image sensing is performed and stored in the memory 16. In the rectangular frame 36 indicative of the combined image-sensible range, the rectangular frame 38 indicative of the current image-sensing range is overwritten with a size corresponding to the zooming ratio at a position corresponding to the present panning/tilting position of the selected camera 10a (or camera 10b). Then, the sensed image is overwritten such that it fits in the rectangular frame 38 (step S13).

Note that when the panning angle or the tilting angle is changed, or the zooming value (magnification ratio) is increased, the position of the rectangular frame 38 is changed, or the size of the rectangular frame 38 is reduced. Therefore, with respect to an area displayed prior to the change, the area stored in the memory 16 is displayed.

Whether or not the conditions of the selected camera 10a (or 10b) is desired by an operator is determined by whether or not the confirmation instruct means 26 receives any input operation (step S14). The confirmation instruction is also, similar to other instructions, input by a specific operation of an input apparatus such as a pointing device, e.g. a key board or mouse or the like. The confirmation instruction may not necessary be provided. More specifically, confirmation of the operator may be determined by forthcoming input operation (e.g. camera control request). When a camera control request is continuously inputted, the requests are sequentially processed. If confirmation is not made, the processing returns to step S10 to repeat the camera control request processing and image-sensing and displaying operation.

Figure 5:
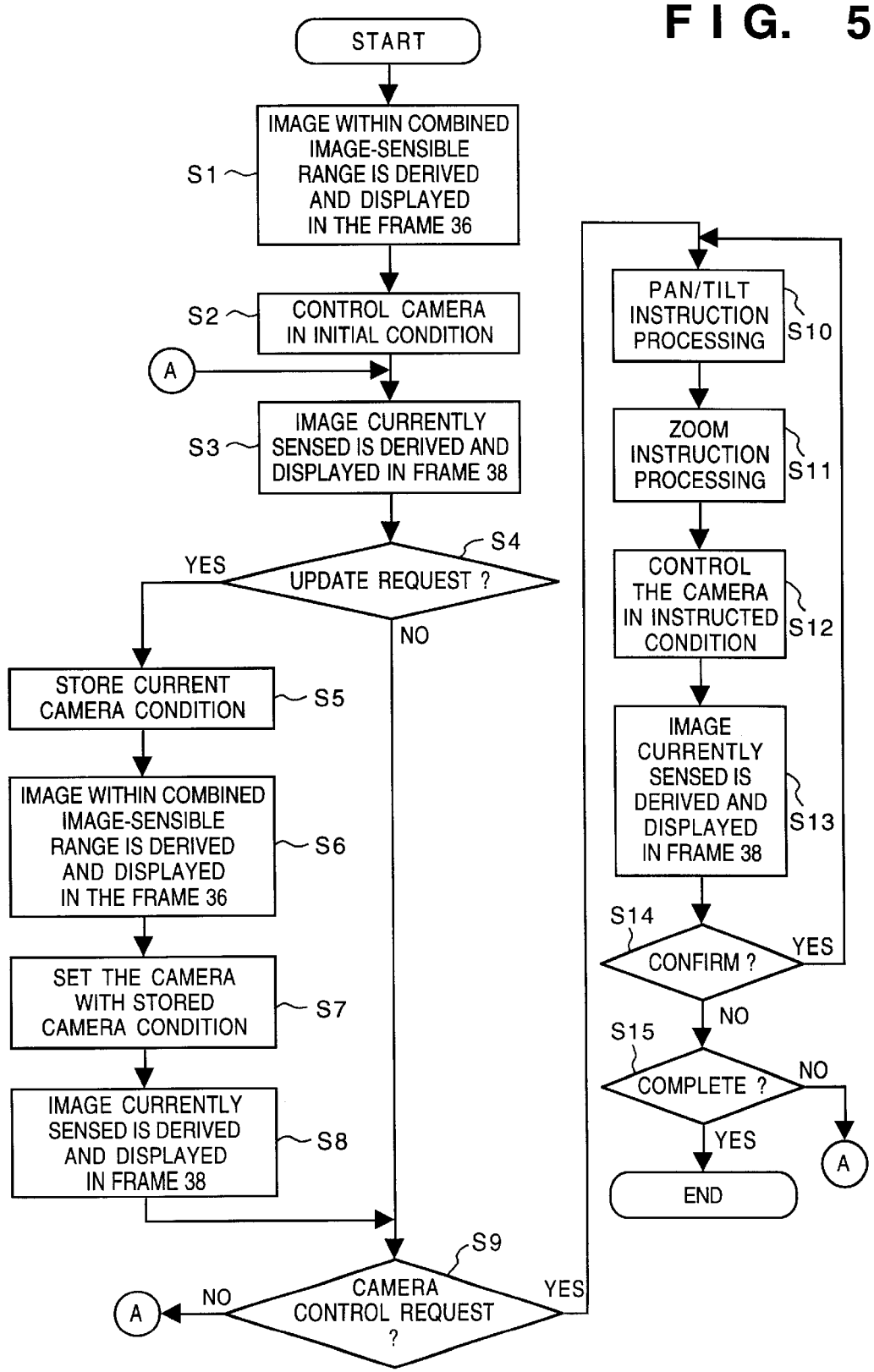
FIG. 5 is a flowchart explaining operation according to the present invention.
Figure 6:
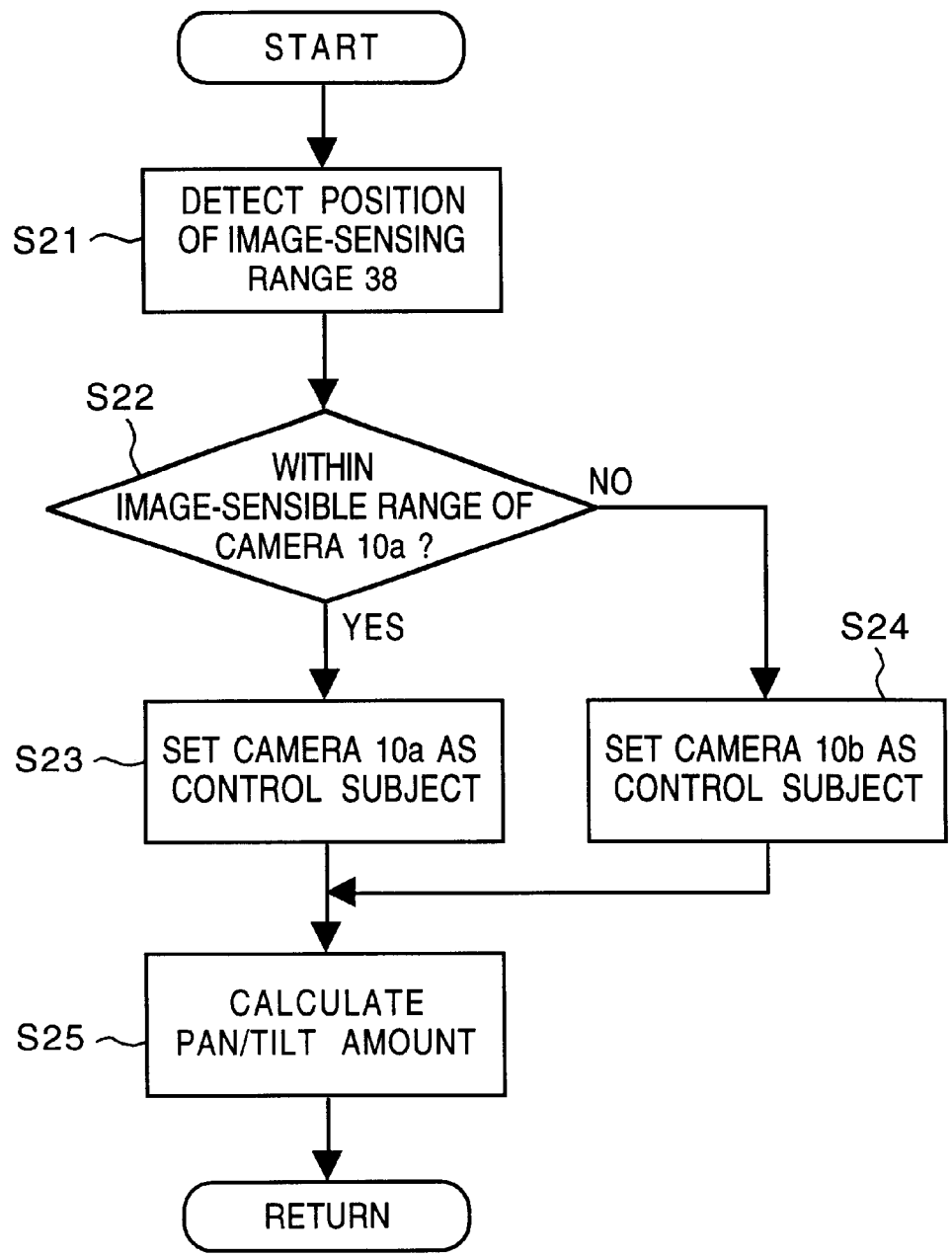
FIG. 6 is a flowchart of panning/tilting instruction processing according to the present embodiment.

Note that in steps S10 and S11 in FIG. 5, the series of processing, that is, from receiving a camera control request to displaying a sensed image of a camera, can be adjusted by changing the response-time interval, or an amount of change in panning/tilting angles or a zooming value. (Herein, the response-time interval is the time necessary to start processing in response to an operator's instruction to change panning/tilting angles or a zooming value.) If the response-time interval or the amount of change are set to a small value, it is possible to make a small adjustment of a selected camera while viewing an image, however the load added to the camera control apparatus 12 is high. On the other hand, if the response-time interval or the amount of change are set to a large value, the small adjustment of the camera is difficult. Thus, the image displayed on the screen moves awkwardly. However, the load added to the camera control apparatus 12 is low.

When it is determined that the camera condition is confirmed by an operator (step S14), it is checked whether or not a terminate instruction of the entire processing is issued (step S15). If it is issued, the processing ends, while if it is not issued, the processing returns to step S3 to repeat the above described operation.

According to the present invention, the image-sensing field of view can be practically enlarged by controlling a plurality of cameras, arranged in juxtaposition so that the image-sensing field of view is continuous, in an integrated manner. In addition, the present invention realizes easy camera operation by an operator so that the operator does not have to deal with cumbersome switching operation of a plurality of cameras. In other words, the operator is able to perform pan/tilt/zoom operation as well as selection of a plurality of cameras by operating the rectangular frame 38 only. The present embodiment is particularly advantageous in a case where image-sensing is performed by following a subject moving from one image-sensible range of a camera to another image-sensible range of another camera, because the operator does not need to perform selecting operation of a camera to be controlled or for image sensing.

Second Embodiment

In the first embodiment, the entire combined image-sensible range (rectangular frame 36) is displayed in the monitor screen. However, one of the rectangular frame 32a or 32b, indicative of the image-sensible ranges of respective cameras 10a and 10b, may be displayed in the screen of the monitor 18. By displaying the rectangular frames 32a and 32b, it is possible to display an image in the combined image-sensible range or a currently-sensing image in a larger size.

Figure 7:
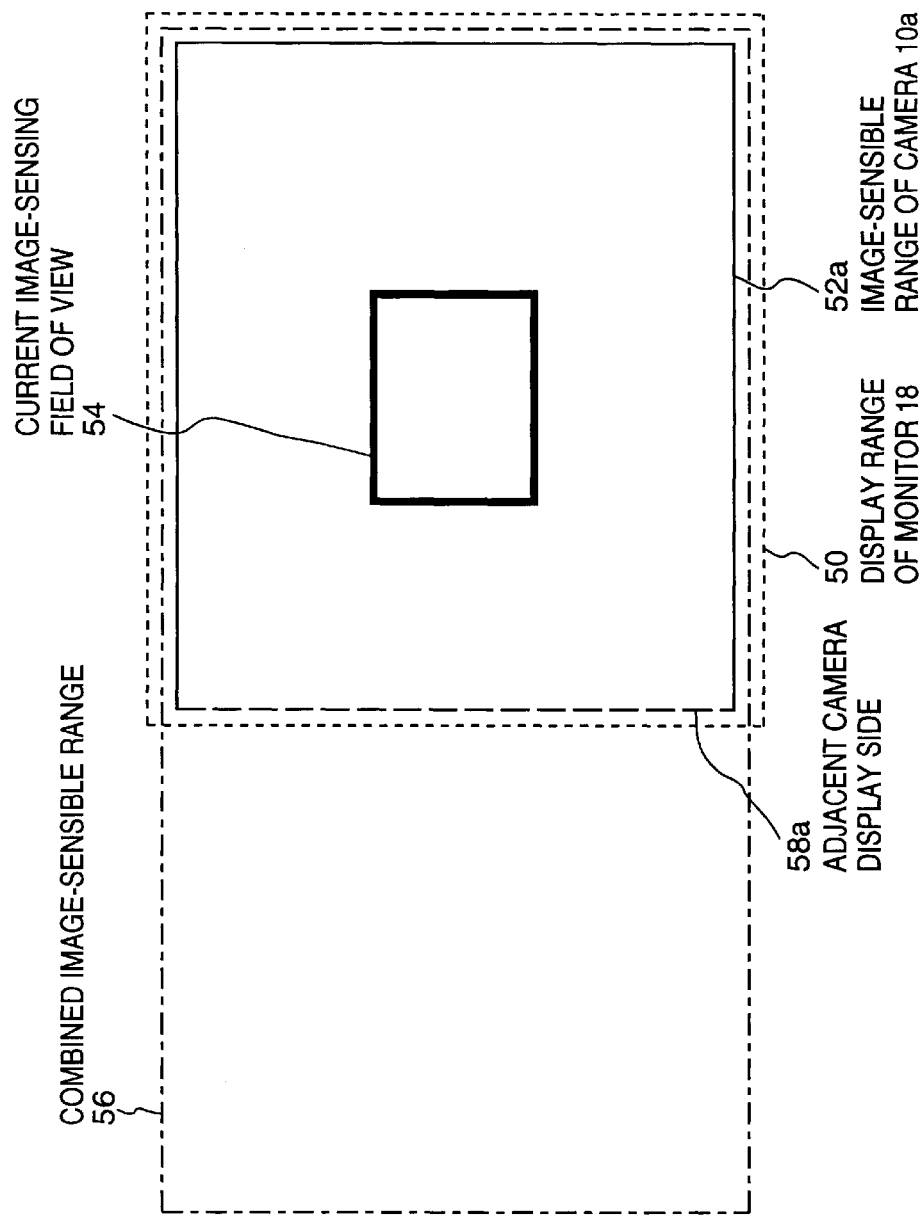
FIG. 7 shows a display screen of the monitor 18 when camera 10a is selected according to the modified embodiment.
Figure 8:
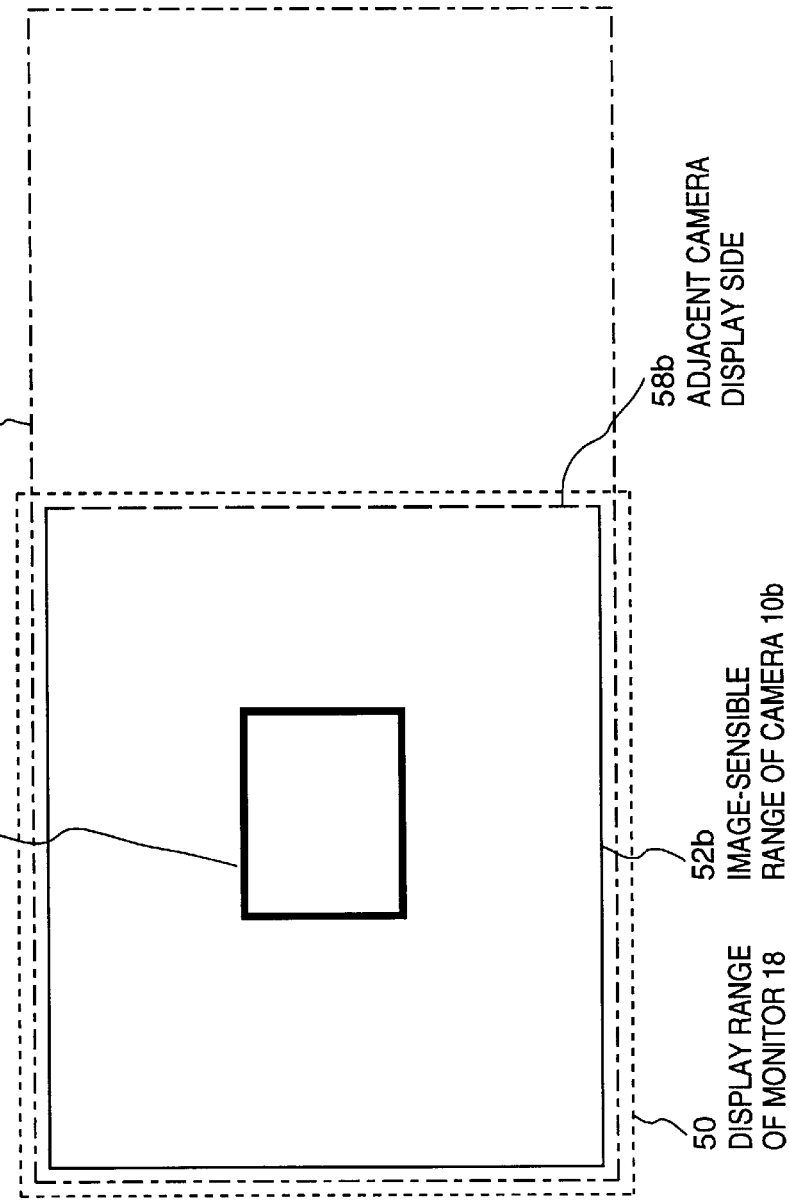
FIG. 8 shows a display screen of the monitor 18 when camera 10b is selected according to the modified embodiment.

For instance, assuming that the camera 10a is selected, the-image-sensible range of the camera 10a is set as large as possible within the display range 50 of the monitor 18 as shown in FIG. 7, and a rectangular frame 52a indicative of the image-sensible range of the camera 10a is displayed in the monitor 18. In the rectangular frame 52a, a rectangular frame 54 indicative of a current image-sensing range is displayed at a position corresponding to the present panning/tilting angles, and with the size corresponding to the zooming ratio. FIG. 8 shows a screen of the monitor 18 in a case where the camera 10b is selected. The image-sensible range of the camera 10b is set as large as possible within the display range 50 of the monitor 18 as shown in FIG. 8, and a rectangular frame 52b indicative of the image-sensible range of the camera 10b is displayed in the monitor 18. In the rectangular frame 52b, a rectangular frame 54 indicative of a current image-sensing range is displayed at a position corresponding to the present panning/tilting angles, and with the size corresponding to the zooming ratio. The rectangular frame 56 indicative of the combined image-sensible range is not displayed on the screen of the monitor 18. Note that the size of the display range 50, rectangular frames 52a, 52b and 56 are exaggerated in the drawings for the illustrative convenience.

When cameras other than the currently-selected camera (camera 10a in FIG. 7 and camera 10b in FIG. 8) are present, the sides 58a and 58b (indicated by broken lines in FIGS. 7 and 8) of the rectangular frames 52a and 52b are displayed in a different form than the other sides of the rectangular frames 52a and 52b, to indicate that the directions adjacent to the sides 58a and 58b are image-sensible by other cameras. The sides may be displayed in a different color.

Figure 9:
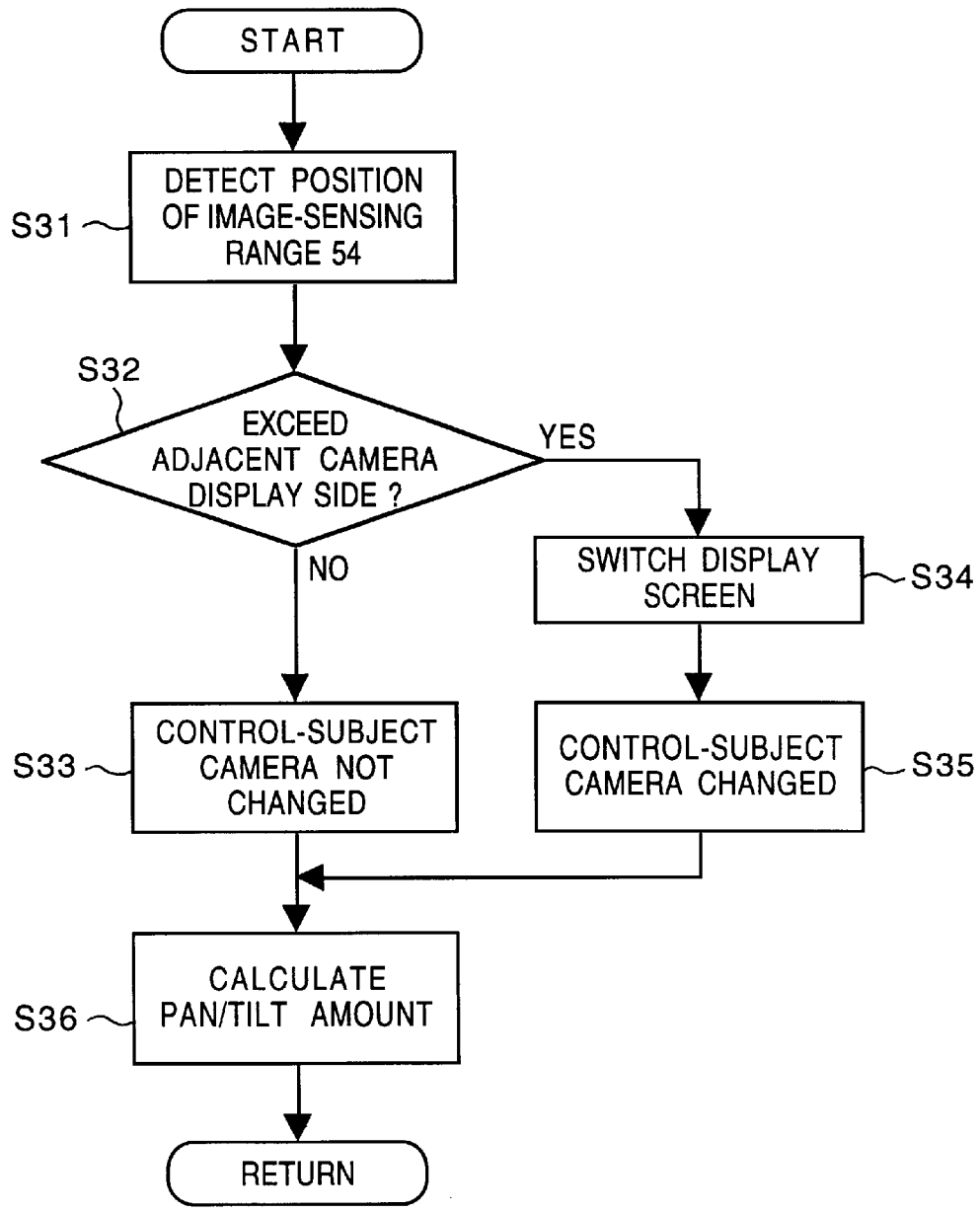
FIG. 9 is a flowchart of panning/tilting instruction processing according to the display method shown in FIGS. 7 and 8.

Referring to the displaying method shown in FIGS. 7 and 8, processing in response to a panning/tilting instruction will be described next. FIG. 9 is a flowchart explaining the process.

First, a position of the rectangular frame 54 which has been moved is detected (step S31). It is determined whether or not the position is outside the rectangular frame 52a (or 52b), exceeding the adjacent camera display side 58a (or 58b) of the rectangular frame 52a which is indicative of the image-sensible range of the currently-selected camera (step S32). In a case where the position does not exceed the adjacent camera display side 58a (or 58b) (step S32), the control-subject camera is not changed (step S33). Meanwhile, in a case where the position exceeds the adjacent camera display side 58a (or 58b) (step S32), the display screen of the monitor 18 is switched (step S34) to a screen corresponding to the image-sensible range of the adjacent camera and the control-subject camera is changed (step S35).

Upon completion of step S33 or step S35, the amount of pan/tilt for the control-subject camera 10a is calculated (step S36) on the basis of the relative position of the rectangular frame 54 with respect to the rectangular frame 52a (or 52b) indicative of the image-sensible range of the control subject camera 10a (or 10b).

By the processing described above with reference to FIGS. 7–9, a sensed image of each camera and an image-sensible range of each camera can be viewed with a larger size although it would become difficult to confirm, with a single glance, the combined image-sensible range. The present embodiment is particularly useful in a case where a predetermined screen size is small, or a case where a large number of cameras are utilized so that a larger size or better resolution of an image is desired to be displayed in the rectangular frame indicative of the current condition of the camera.

Third Embodiment

In the first and second embodiments, one of the two cameras is controlled, and the selected camera is controlled each time a panning/tilting angle or a zooming value is changed by operation of the frame 38 indicative of the current image-sensing range.

When the position or size of the frame 38 is changed within the image-sensible range of one of the cameras, not many problems arise. However, when an instruction is given to move the frame 38 from the image-sensible range of camera 10a to the image-sensible range of camera 10b, if the direction of optical axes or zooming value of the camera 10b is different from those of the camera 10a it would take a while to apply the conditions of the camera 10a to the conditions of the camera 10b. More specifically, assume that the frame 38 is located within the image-sensible range 32a of the camera 10a. If the frame 38 is moved to the image-sensible range 32b of the camera 10b, exceeding the field of view overlapping area 34, the displaying of the sensed image may be slightly delayed, depending on the conditions of the camera 10b.

Figure 10:
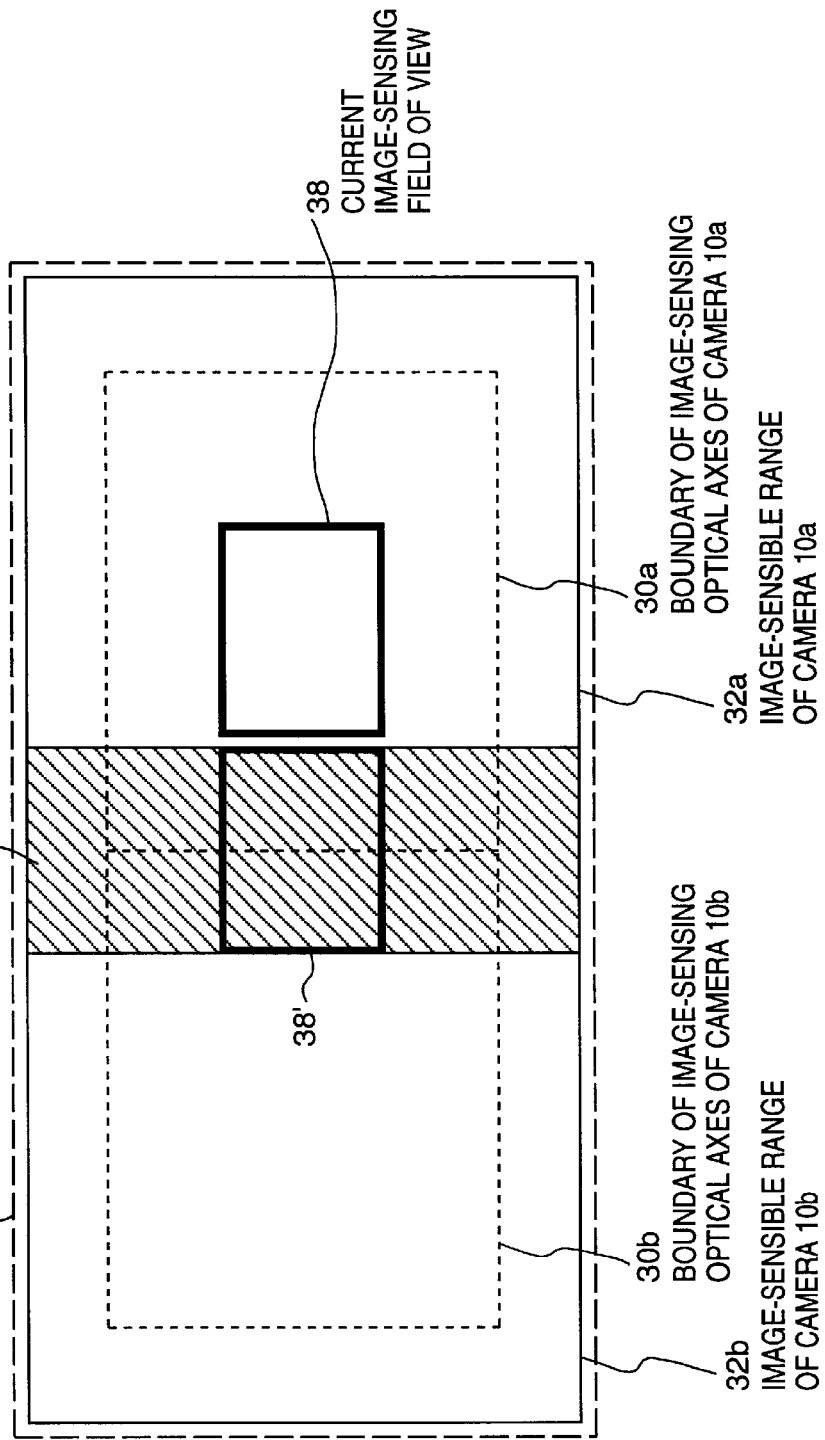
FIG. 10 is a view for explaining overall operation according to the third embodiment.

In view of the above, according to the third embodiment, while the frame 38 indicative of the current image-sensing range is within the image-sensible range 32a and an operator performs control operation of the camera 10a the camera 10b is controlled such that a rectangular frame 38', indicative of an image-sensing range of the camera 10b, is always in stand-by condition within the field of view overlapping area 34, as shown in FIG. 10. More specifically, while the panning angle of the camera 10b is fixed such that the frame 38' always stays within the field of view overlapping area 34, the tilting angle and zooming value of the camera 10b are changed along with changes in the tilting angle and zooming value of the camera 10a which performs image sensing. By virtue of this, when the frame 38 is moved from the image-sensible range 32a of the camera 10a to the field of view-overlapping area 34, then moved further to the image-sensible range 32b of the camera 10b, the camera control is performed quickly without taking much time. Therefore, an operator is able to view natural motion of the subject image. Note that the frame 38' is not actually displayed.

Figure 11:
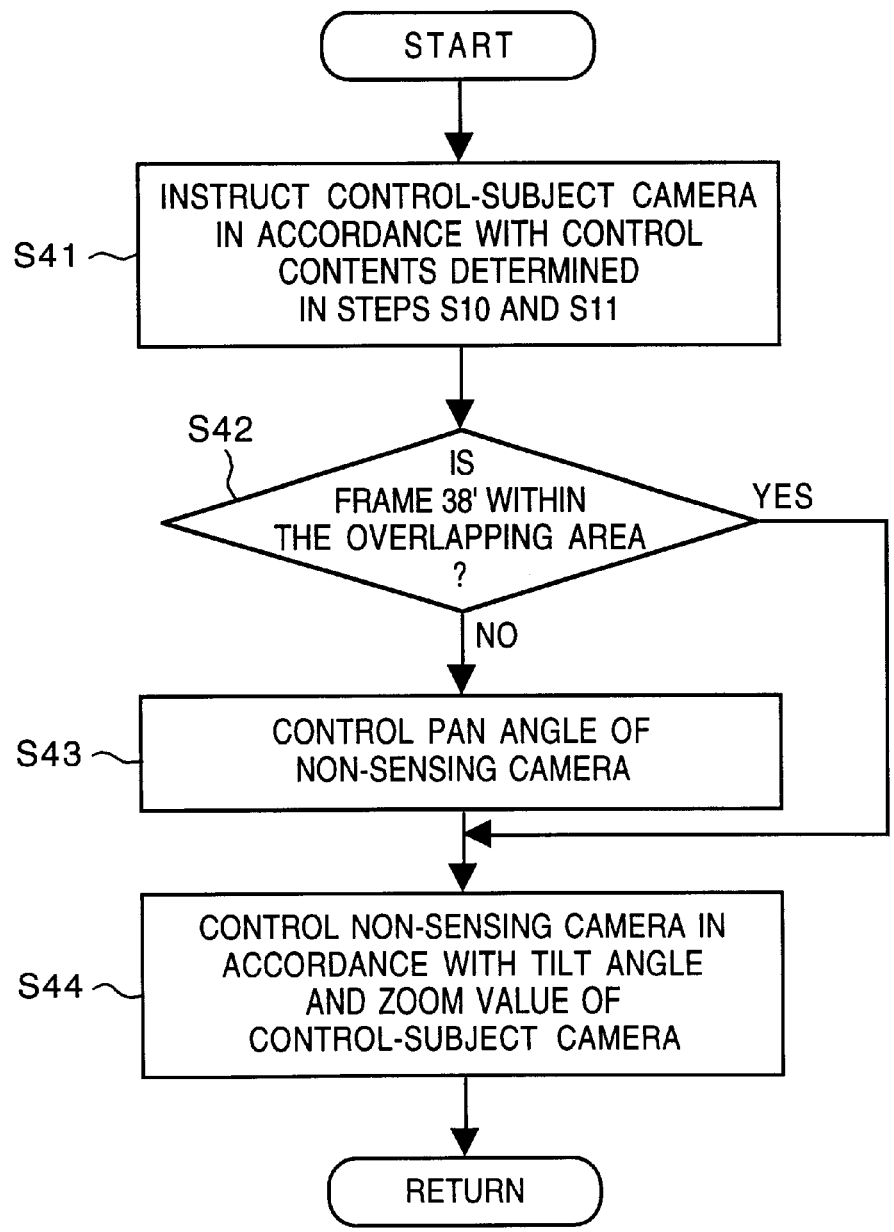
FIG. 11 is a flowchart describing detailed processing of step S12 shown in FIG. 5 according to the third embodiment.

In order to realize the above, the processing shown in FIG. 11 is performed in step S12 of FIG. 5.

Note that in the following descriptions, a camera whose sensed image is displayed in the frame 38 will be referred to as a "control-subject camera," and a camera corresponding to the frame 38' which is standing-by in the field of view overlapping area 34 will be referred to as a "non-sensing camera," for the purpose of explanatory convenience. In a case where the camera 10a is the control-subject camera, the camera 10b becomes non-sensing camera, or vice versa.

Referring to FIG. 11, in step S41, the control-subject camera is controlled in accordance with a panning angle, tilting angle and zooming value determined in steps S10 and S11 of FIG. 5.

The processing proceeds to step S42 where the current direction of non-sensing camera is detected (e.g., cameras 10a and 10b have a function which returns the current conditions in response to a predetermined request to send a current status, or the cameras always store the current conditions of each camera in a predetermined area of the memory 16) to determine whether or not the frame 38' of the non-sensing camera is within the field of view overlapping area 34. If NO in step S42, the panning angle of the non-sensing camera is controlled in step S43 such that the frame 38' is moved to the field of view overlapping area 34, and the processing proceeds to step S44. If YES in step S42, the processing in step S43 is skipped and the processing proceeds to step S44.

In step S44, the conditions of the non-sensing camera are controlled such that its tilting angle and zooming value are identical to those of the control-subject camera.

According to the above processing, assuming that the camera 10a is the control-subject camera, when the position or size of the frame 38 is changed within the image-sensible range 32, the non-sensing camera can be maintained in the state such that the non-sensing camera faces the field of view overlapping area 34.

Note that in the first, second and third embodiments, descriptions have been provided for a case where two cameras are arranged in parallel, side by side; however the cameras may be arranged one on top of the other, or any other manner. Moreover, the number of cameras is not limited to two, but may be three or more.

Figure 12:
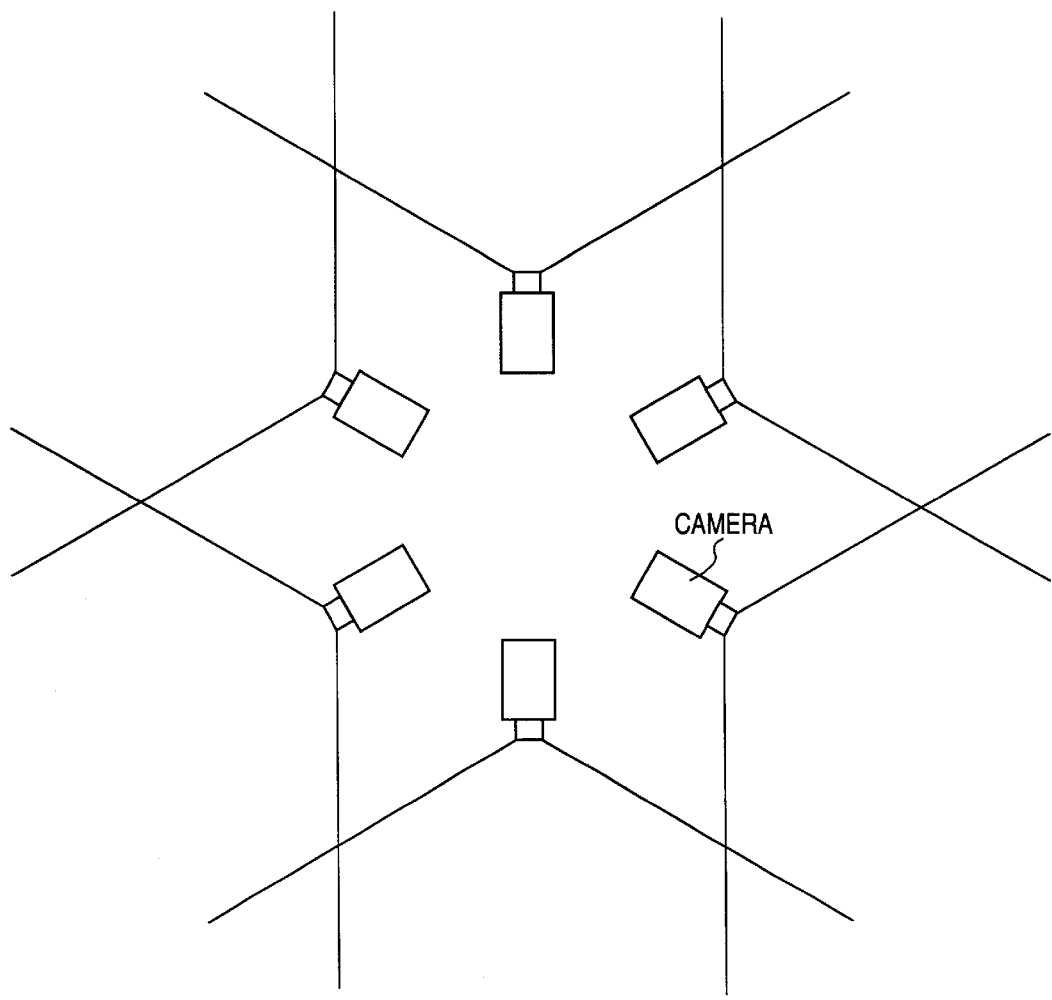
FIG. 12 is an explanatory view showing an example of camera arrangement according to the third embodiment.

In the case where a plurality of cameras are parallelly arranged as shown in FIG. 2, a predetermined distance must be secured between the cameras so that the image-sensible ranges of the cameras partially overlap each other. If the plurality of cameras are arranged as shown in FIG. 12 so that each of the cameras faces different directions, the distance between the cameras is substantially ignored. In the case of FIG. 12, an operator is able to perform camera control in 360° panning angle as if the operator is operating only a single camera.

In addition, in the foregoing embodiments, an example has been provided in a case where a plurality of cameras are connected to a single control apparatus; however, the present invention is not limited to this. For instance, a network interface card may be included and the present apparatus may serve as a camera server in a network. A client of the server would perceive as if one camera is being shared on the camera server.

The present invention can be applied to a system constituted by a plurality of devices, or to an apparatus comprising a single device. Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

As has been readily understood by the above descriptions, according to the present invention, it is possible to select a camera and operate the image-sensing direction as well as magnification ratio of the camera while acknowledging the currently-sensing image, taking into consideration of the combined image-sensible range of a plurality of cameras and a current image-sensing range therein. The present invention is particularly advantageous since the operation of image sensing becomes easy when image sensing is performed by following a subject moving from one image-sensible range of one camera to another image-sensible range of another camera. Moreover, an operator is able to easily operate a plurality of cameras as if he/she is operating a single camera having a large field of view.

The present invention is not limited to the above embodiments and various changes and modifications can be made within the spirit and scope of the present invention. Therefore, to appraise the public of the scope of the present invention, the following claims are made.

What is claimed is:

1. A camera control apparatus for controlling a plurality of video cameras which are controllable with respect to at least one of panning and tilting angles, comprising:
    a display control device for displaying a first area indicative of a wide image-sensible range formed by combining image-sensible ranges, each of said ranges defined by limit of at least one of panning and tilting of each of the video cameras, said first area exceeding a field of view of a camera and being formed by combining images sensed by the plurality of video cameras;
    a detecting device for detecting a position, which is pointed to by a user, within the first area; and
    a selection device for selecting a camera of the plurality of video cameras corresponding to a detecting result of said detecting device.

2. The camera control apparatus according to claim 1, wherein said display control device displays an image sensed by the camera selected by said selection device.

3. The camera control apparatus according to claim 1, further comprising combining device for combining images sensed by controlling each of the video cameras, and for displaying a wide-area image obtained by combining the images within the first area.

4. The camera control apparatus according to claim 1, further comprising:
    control device for controlling at least one of panning and tilting of the video camera selected by said selection device in accordance with the pointed position.

5. The camera control apparatus according to claim 1, wherein said display control device displays a second area indicative of a field of view currently image-sensed by the selected camera within the first area;
    wherein said a display position of the second area is changed so as to select a desired position within the first area.

6. The camera control apparatus according to claim 5, wherein said image-sensible ranges corresponding to each of the video cameras overlap each other, where the overlapped portion is, at least, larger than the second area.

7. The camera control apparatus according to claim 5, wherein said display control device displays an image sensed by the camera selected by said selection means, said display control device displaying the image in the second area.

8. The camera control apparatus according to claim 5, wherein said video camera is also controllable with respect to magnification ratio of image sensing.

9. The camera control apparatus according to claim 8, wherein said display control device displays the second area in a size corresponding to a zoom value of the selected camera.

10. The camera control apparatus according to claim 9, wherein said detecting device detects a change of the size of said second area, said control apparatus further comprising control device for, in accordance with the position and the size of the second area detected by said detecting device, controlling at least one of panning and tilting and zooming of the camera selected by said selection device.

11. The camera control apparatus according to claim 5, wherein said display control device displays a partial area, surrounding said second area, of said first area.

12. The camera control apparatus according to claim 1, further comprising:
    control device for controlling at least one of panning and tilting of the video camera selected by said selection device.

13. The camera control apparatus according to claim 1, wherein the first area comprises a seamless image formed by combining images sensed by the plurality of video cameras.

14. A control method of a camera control apparatus for controlling a plurality of video cameras which are controllable with respect to at least one of panning and tilting angles, comprising:
    a first display step of displaying a first area indicative of a wide image-sensible range formed by combining image-sensible ranges, each of the ranges defined by limit of at least one of panning and tilting of each of the video cameras, said first area exceeding a field of view of a camera and being formed by combining images sensed by the plurality of video cameras;
    a detecting step of detecting a designation of a desired position within the first area; and
    a selecting step of selecting a camera corresponding to a designated position in accordance with the detection result of said detecting step.

15. The control method according to claim 14, wherein said image-sensible ranges corresponding to each of the video cameras overlap each other, where the overlapped portion is, at least, larger than the second area.

16. The control method according to claim 14, further comprising an image display step for displaying an image sensed by the camera selected by said selection step.

17. The control method according to claim 14, further comprising a combining step for combining images sensed by controlling each of the video cameras and for displaying a wide-area image obtained by combining the images within the first area.

18. The control method according in claim 14, wherein said first display step displays a partial area, surrounding said second area, of said first area.

19. The control method according to claim 14, further comprising:
    a second display step of displaying a second area indicative of a field of view currently image-sensed by the selected camera within the first area;
    wherein a display position of the second area is changed so as to select a desired position within the first area.

20. The control method according to claim 19, further comprising:
    an image display step for displaying an image sensed by the camera selected by said selection step;
    wherein said image display step displays the image in the second area.

21. The control method according to claim 19, wherein said video camera is also controllable with respect to magnification ratio of image sensing.

22. The control method according to claim 21, wherein the second display step displays the second area in a size corresponding to a zoom value of the selected camera.

23. The control method according to claim 22, further comprising a control step for, in accordance with the position and the size of said second area, controlling at least one of panning, tilting and zooming of the camera selected by the selecting step.

24. The control method according to claim 19, further comprising:
a control step for controlling at least one of panning or tilting of the video camera selected by said selecting step in accordance with the position of said second area.

25. The control method according to claim 14, further comprising:
a control step for controlling at least one of panning or tilting of the video camera selected by said selecting step.

26. A storage medium storing computer-readable program codes for controlling a plurality of video cameras which are controllable with respect to at least one of panning and tilting angles, comprising:
a first-display-step program code for displaying a first area indicative of a wide image-sensible range formed by combining image-sensible ranges, each of image-sensible ranges defined by limit of at least one of panning and tilting of each of the video cameras, said first area exceeding a field of view of a camera and being formed by combining images sensed by the plurality of video cameras;
a detecting-step program code for a designation of a desired position within the first area; and
a selecting-step program code for selecting a camera corresponding to a designated position in accordance with the detection result of said detecting step.

27. The storage medium according to claim 26, further comprising an image-display-step program code for displaying an image sensed by the camera selected by the selecting-step program code.

28. The storage medium according claim 26, further comprising a combining-step program code for combining images sensed by controlling each of the video cameras and for displaying a wide-area image obtained by combining the image within the first area.

29. The storage medium according to claim 26, further comprising:
a second display program code for displaying a second area indicative of a field of view currently image-sensed by the selected camera within the first area;
wherein a display position of the second area is changed so as to select a desired position within the first area.

30. The storage medium according to claim 29, wherein said image-sensible ranges corresponding to each of the video cameras overlap each other, where the overlapped portion is, at least, larger than the second area.

31. The storage medium according to claim 29, further comprising an image-display-step program code for displaying the image in the second area,
wherein said image-display-step code displays the image in the second area.

32. The storage medium according to claim 29, wherein said video camera is also controllable with respect to magnification ratio of image sensing.

33. The storage medium according to claim 32, wherein the second-display step program code displays the second area in a size corresponding to a zoom value of the selected camera.

34. The storage medium according to claim 33, further comprising a control-step program code for, in accordance with the position and the size of said second area, controlling at least one of panning, tilting and zooming of the camera selected by the selecting-step program code.

35. The storage medium according to claim 29, further comprising:
a control-step program code for controlling at least one of panning or tilting of the video camera selected by said selecting-step program code in accordance with the position of said second area.

36. The storage medium according to claim 29, wherein said first-display-step program code displays a partial area, surrounding said second area, of said first area.

37. The storage medium according to claim 26, further comprising:
a control-step program code for controlling at least one panning and tilting of the video camera selected by said selecting step program code.

38. A camera control apparatus for controlling a plurality of image sensing apparatuses, comprising:
displaying unit for displaying a first area indicative of a wide image-sensible range formed by combining image sensible ranges, each of said ranges defined by limit of at least one of panning and tilting of the image sensing apparatuses, said first area exceeding each field of view of the image sensing apparatuses and being formed by combining images sensed by the plurality of image sensing apparatuses; and
control unit for selecting an image sensing apparatus of the plurality of image sensing apparatus corresponding to a position, which is pointed to by a user, within the first area.

39. The camera control apparatus according to claim 38, wherein said displaying unit displays a second area indicative of a field of view currently image-sensed by the selected image sensing apparatus within the first area.

40. The camera control apparatus according to claim 39, wherein said control unit controls at least one of panning and tilting of the selected image sensing apparatus in accordance with detecting a change of a position of said second area.

41. The camera control apparatus according to claim 39, wherein said control unit controls a magnification of the selected image sensing apparatus in accordance with detecting a change of the size of said second area.

42. The camera control apparatus according to claim 38, wherein said display unit displays an image sensed by said selected image sensing apparatus.

43. A camera control apparatus for controlling a plurality of video cameras which are controllable with respect to panning and tilting angles, comprising:
a display control device for displaying a first area indicative of a wide image-sensible range formed by combining image-sensible ranges, each of said ranges defined by limit of panning and tilting of each of the video cameras, said first area exceeding a field of view of a camera;
a detecting device for detecting a position, which is pointed to by a user, within the first area; and
a selection device for selecting a camera of the plurality of video cameras corresponding to a detecting result of said detecting device.

44. The camera control apparatus according to claim 43, wherein said display control device displays a second area indicative of a field of view currently image-sensed by the selected camera within the first area;
wherein a display position of the second area is changed so as to select a desired position within the first area.

45. A control method of a camera control apparatus for controlling a plurality of video cameras which are controllable with respect to panning and tilting angles, comprising:
a first display step of displaying a first area indicative of a wide image-sensible range formed by combining image-sensible ranges, each of the ranges defined by limit of panning and tilting of each of the video cameras, said first area exceeding a field of view of a camera;

a detecting step of detecting a designation of a desired position within the first area; and a selecting step of selecting a camera corresponding to a designated position in accordance with the detection result of said detecting step.

46. The control method according to claim 45, further comprising:

a second display step of displaying a second area indicative of a field of view currently image-sensed by the selected camera within the first area;

wherein a display position of the second area is changed so as to select a desired position within the first area.

47. A storage medium storing computer-readable program codes for controlling a plurality of video cameras which are controllable with respect to panning and tilting angles, comprising:

a first-display-step program code for displaying a first area indicative of a wide image-sensible range formed by combining image-sensible ranges, each of image-sensible ranges defined by limit of panning and tilting of each of the video cameras, said first area exceeding a field of view of a camera;

a detecting-step program code for a designation of a desired position within the first area; and a selecting-step program code for selecting a camera corresponding to a designated position in accordance with the detection result of said detecting step.

48. The storage medium according to claim 47, further comprising:

a second display program code for displaying a second area indicative of a field of view currently image-sensed by the selected camera within the first area;

wherein a display position of the second area is changed so as to select a desired position within the first area.

49. A camera control apparatus for a controlling a plurality of image sensing apparatuses which are controllable with respect to panning and tilting angles, comprising:

displaying unit for displaying a first area indicative of a wide image-sensible range formed by combining image sensible ranges, each of said ranges defined by limit of panning and tilting of the image sensing apparatuses, said first area exceeding each field of view of the image sensing apparatuses; and controlling unit for selecting an image sensing apparatus of the plurality of image sensing apparatuses corresponding to a position, which is pointed to by a user, within the first area.

50. The camera control apparatus according to claim 49, wherein said displaying unit displays a second area indicative of a field of view currently image-sensed by the selected image sensing apparatus within the first area.

* * * * *

UNITED STATES PATENT AND TRADEMARK OFFICE
CERTIFICATE OF CORRECTION

PATENT NO. : 6,760,063 B1
DATED : July 6, 2004
INVENTOR(S) : Yoichi Kamei

It is certified that error appears in the above-identified patent and that said Letters Patent is hereby corrected as shown below:

Title page,
Item [75], Inventor, delete "Chofu (JP)" and insert -- Tokyo (JP) --

Column 4,
Line 49, delete "10*a*if" and insert -- 10a, if --

Column 8,
Line 9, delete "the-image-sensible" and insert -- the image-sensible --

Column 9,
Line 22, delete "10*a*it" and insert -- 10a, it --
Line 34, delete "10*a*the" and insert -- 10a, the --
Line 46, delete "view-overlapping" and insert -- view overlapping --

Signed and Sealed this

Eighth Day of March, 2005

JON W. DUDAS
*Director of the United States Patent and Trademark Office*